(12) United States Patent
Ho et al.

(10) Patent No.: US 7,342,708 B2
(45) Date of Patent: Mar. 11, 2008

(54) ELECTROCHROMIC DEVICE USING POLY(3,4-ETHYLENEDIOXYTHIOPHENE) AND DERIVATIVES THEREOF

(75) Inventors: Kuo-Chuan Ho, Hsin Tien (TW); Tsai-Shih Tung, Sanchong (TW); Bih-Ya Chen, Taipei (TW)

(73) Assignee: Tropics Enterprise Co. Ltd. (TW)

( * ) Notice: Subject to any disclaimer, the term of this patent is extended or adjusted under 35 U.S.C. 154(b) by 544 days.

(21) Appl. No.: 10/832,772

(22) Filed: Apr. 26, 2004

(65) Prior Publication Data

US 2005/0237594 A1 Oct. 27, 2005

(51) Int. Cl.
*G02F 1/153* (2006.01)
*G09G 3/19* (2006.01)

(52) U.S. Cl. .......................... 359/268; 359/273; 345/49

(58) Field of Classification Search ................. 359/265, 359/268–271, 273; 345/49; 348/817
See application file for complete search history.

(56) References Cited

U.S. PATENT DOCUMENTS

| | | | |
|---|---|---|---|
| 4,645,307 A | 2/1987 | Miyamoto et al. | |
| 4,773,741 A | 9/1988 | Inaba et al. | |
| 4,902,108 A | 2/1990 | Byker | |
| 4,959,430 A | 9/1990 | Jonas et al. | |
| 5,215,821 A | 6/1993 | Ho | |
| 5,282,955 A * | 2/1994 | Leventis et al. | 205/317 |
| 6,157,479 A | 12/2000 | Heuer et al. | |
| 6,175,441 B1 | 1/2001 | Heuer et al. | |
| 6,323,988 B1 | 11/2001 | Heuer et al. | |
| 6,327,070 B1 | 12/2001 | Heuer et al. | |
| 6,403,741 B1 | 6/2002 | Heuer et al. | |
| 6,452,711 B1 | 9/2002 | Heuer et al. | |
| 6,507,428 B1 | 1/2003 | Heuer et al. | |
| 6,747,780 B2 * | 6/2004 | Xu et al. | 359/265 |

OTHER PUBLICATIONS

Argun, Avni A. et al., "The First Truly All-Polymer Elecrochromic Devices," Adv. Mater. (Aug. 2003), vol. 15, pp. 1338-1341.
Cirpan, Ali et al., "Electrochromic devices based on soluble and processable dioxythiophene polymers," J. Mater. Chem. (2003), vol. 13, pp. 2422-2428.
Crumbliss, Alvin L. et al., "Alkali Metal Cation Effects in a Prussian Blue Surface-Modified Electrode," Inorg. Chem. (1984), vol. 23, pp. 4701-4708.
DeLongchamp, Dean et al., "Layer-by-Layer Assembly of PEDOT/Polyaniline Electrochromic Devices," Adv. Mater. (Oct. 2001), vol. 13, pp. 1455-1459.
DePaoli, Marco-A et al. "All-polymeric electrochromic and photoelectrochemical devices: new advances," Electrochim. Acta (2001), vol. 46, pp. 4243-4249.
DePaoli, Marco-A et al. "All polymeric solid state electrochromic devices," Electrochim. Acta (1999), vol. 44, pp. 2983-2991.

(Continued)

*Primary Examiner*—Ricky Mack
*Assistant Examiner*—William C Choi
(74) *Attorney, Agent, or Firm*—Squire, Sanders & Dempsy L.L.P.

(57) ABSTRACT

The present invention relates to complementary electrochromic devices comprising poly(3,4-ethylenedioxythiophene) and derivatives thereof as a cathodically coloring layer and an indium hexacyanometallate or transition metal hexacyanometallate as an anodically coloring layer.

29 Claims, 11 Drawing Sheets

OTHER PUBLICATIONS

Groenendaal, L. "Bert" et al. "Electrochemistry of Poly(3,4-alkylenedioxythiophene) Derivatives," Adv. Mater. (Jun. 2003), vol. 15, pp. 855-879.

Groenendaal, L. "Bert" et al., "Poly(3,4-ethylenedioxythiophene) and Its Derivatives: Past, Present, and Future," Adv. Mater. (2000), vol. 12, pp. 481-494.

Gustafsson, J.C. et al., "In situ spectroscopic investigations of electrochromism and ion transport in a poly(3,4-ethylenedioxythiophene) electrode in a solid state electrochemical cell," Solid State Ionics (1994), vol. 69, pp. 145-152.

Heuer, Helmut W. et al., "Electrochromic Window Based on Conducting Poly(3,4-ethylenedioxythiophene)-Poly(styrene sulfonate)," Adv. Funct. Mater. (Feb. 2002), vol. 12, pp. 89-94.

Itaya, K. et al. "Spectroelectrochemistry and Electrochemical Preparation Method of Prussian Blue Modified Electrodes," J. Am. Chem. Soc., (1982), vol. 104, pp. 4767-4772.

Neff, Vernon D., "Electrochemical Oxidation and Reduction of Thin Films of Prussian Blue," J. Electrochem. Soc. (Jun. 1978), vol. 125, pp. 886-887.

Sapp, Shawn A. et al., "High Contrast Ratio and Fast-Switching Dual Polymer Electrochromic Devices," Chem. Mater. (1998), vol. 10, pp. 2101-2108.

Sapp, Shawn A. et al., "Rapid Switching Solid State Electrochromic Devices Based on Complementary Conducting Polymer Films," Adv. Mater. (1996), vol. 8, pp. 808-811.

Schwendeman, Irina et al., "Enhanced Contrast Dual Polymer Electrochromic Devices," Chem. Mater. (2002), vol. 14, -pp. 3118-3122.

Schwendeman, Irina et al., "Perfluoroalkanoate-Substituted PEDOT for Electrochromic Device Applications," Adv. Funct. Mater., (Jul. 2003), vol. 13, pp. 541-547.

Welsh, Dean M. et al., "Enhanced Contrast Ratios and Rapid Switching in Electrochromics Based on Poly(3,4-propylenedioxythiophene) Derivatives," Adv. Mater., (1999) vol. 11, pp. 1379-1382.

* cited by examiner

ELECTROCHROMIC DEVICE USING POLY(3,4-ETHYLENEDIOXYTHIOPHENE) AND DERIVATIVES THEREOF

FIELD OF THE INVENTION

This invention relates to the fields of organic chemistry, inorganic chemistry, organometallic chemistry, electrochemistry and electrochromic devices.

BACKGROUND OF THE INVENTION

The following is provided as background information only and is not intended and is not to be construed as being prior art to the invention herein.

Electrochromism is a reversible, visible change in optical absorption in response to a dc voltage change. When certain chemical species are placed in an electrical field, the field induces a change in the reduction-oxidation (redox) state of the species. The change in redox state is accompanied by a change in visible color. Typically, the electrochromic species change from a high-transmittance, colorless or lightly colored state to a low transmittance, highly colored state. When the electrical field is reversed, these electrochromic species revert to their original color.

An electrochromic device (ECD) is comprised of at least two conducting or "electrode" layers, at least two electrochromic layers and one electrolyte layer dispersed between the electrochromic layers. The device, sometimes referred to as a "cell" in reference to its resemblance to an battery cell, can be a solution (in which case there are no actual layers), a thin-film or a hybrid, i.e., solid conducting and electrochromic layers with a liquid electrolyte layer. One of the first reports of an ECD was published in the late 1960s (S. K. Deb, *Appl. Opt.,* 1969, Suppl. 3:193).

During the last three decades, ECDs have found a host of applications such as, without limitation, antiglare mirrors, secondary batteries, static displays and solar-attenuated windows. They have been especially useful in this last application, windows, where they serve as both light and heat regulating devices, since they are particularly amenable to relatively large surface areas.

Complementary electrochromic devices are those in which two different electrochromic chemical species that have an additive optical relationship to one another are used. That is, one of the species changes from transmissive to colored at a positive voltage, that is at the cathode side of the ECD and the other species changes from transmissive to colored at the corresponding negative voltage at the anode of the ECD. The value of complementary systems lies in their ability to achieve a greater transmittance window, i.e., the difference between the maximum bleached (colorless or lightly colored, i.e., transmissive) state of the device and the minimum darkened (highly colored) state, than single electrochromic species devices. Thus, one of the complementary species changes from a high transmittance, colorless or lightly colored state to a relatively low transmittance, colored state under the influence of a positive electric field and then reverts to its original state when the field is reversed and its complement reacts in exactly the opposite manner; that is, under a positive potential it is colorless or lightly colored and highly transmissive while under a negative potential it is colored and of relatively low transmittance. Examples of complementary electrochromic devices include poly(3,4-ethylenedioxythiophene) as the cathodically coloring species and certain metal oxides or conductive polymers as the anodic counter-electrode species (U.S. Pat. No. 6,157,479;

S. A. Sapp, et al., *Adv. Mater.,* 1996, 8:808-11; M. A. DePaoli, et al., *Electrochim. Acta,* 2001, 46:4243-49). Such systems are, however, problematic. With regard to metal oxide-based devices, the transmittance window, the difference between the maximum bleached state transmittance and the minimum darkened state transmittance is generally quite limited, less than 40% in most cases. On the other hand, while the transmittance window for conductive polymer counter-electrode devices is substantially greater than that of the metal oxide devices, their stability, that is, the number of times the device can be switched back and forth between a high transmittance and a low transmittance state while maintaining its transmittance window, is substantially lower.

What is needed is a complementary electrochromic device that provides both a large transmittance window together with long term dynamic (under application of switching electric fields) and static (resting state) stability. The present invention provides such complementary electrochromic devices.

SUMMARY OF THE INVENTION

Thus, in one aspect, this invention relates to a complementary electrochromic device, comprising: a first conductive layer; a second conductive layer, which may be the same as or different from the first conductive layer; a cathodically coloring polymer layer in electrical contact with the first conductive layer; an anodically coloring substance layer in electrical contact with the second conductive layer; a transparent electrolyte layer positioned between and in contact with both the cathodically coloring polymer layer and the anodic coloring substance layer wherein, upon application of a negative voltage to the first conductive layer relative to the second conductive layer, the cathodically coloring polymer layer and the anodically coloring substance layer are both in a low transmissivity state and upon application of a positive voltage to the first conductive layer relative to the second conductive layer, the cathodically coloring polymer and the anodically coloring substance layer are both in a high transmissivity state; wherein the cathodically coloring polymer has the chemical structure:

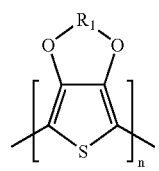

wherein: $R_1$ is selected from the group consisting of $[-CH_2-]_r$, $-CH_2CH(R_2)-$ and $-CH_2C(R_3)(R_4)CH_2-$; r is 1, 2, 3, or 4; n is the number of repeat monomer units in the polymer; $R_2$ is selected from the group consisting of branched or straight-chain (1C-20C)alkyl, hydroxy(1C-20C)alkyl, methoxy(1C-20C)alkyl and phenyl; $R_3$ and $R_4$ are independently selected from the group consisting of branched or straight-chain (1C-10C)alkyl and phenyl; and, the anodically coloring substance comprises a chemical compound selected from the group consisting of an indium hexacyanometallate and a transition metal hexacyanometallate.

In an aspect of this invention, the first and second conductive layers comprise one or more substances selected from the group consisting of a metal oxide, a doped metal oxide and a conducting polymer.

In an aspect of this invention, the first and second conductive layers comprise one or more substances independently selected from the group consisting of tin oxide, indium-tin oxide, fluorine-doped tin oxide, zinc oxide, antimony-doped zinc oxide and poly(3,4-ethylenedioxythiophene)/poly(styrene sulfonic acid).

In an aspect of this invention one of the conductive layers is transparent and the other conductive layer comprises a reflective deposited metal selected from the group consisting of silver, aluminum, copper, platinum, palladium and gold.

In an aspect of this invention, the cathodically coloring polymer comprises a compound selected from the group consisting of poly(3,4-ethylenedioxythiophene), poly(3,4-propylenedioxythiophene), poly(3,4-butylenedioxythiophene), poly(2-methyl-2,3-dihydrothieno[3,4-b][1,4]dioxepine), poly(2-hexyl-2,3-dihydrothieno[3,4-b][1,4]dioxepine), poly(2-octyl-2,3-dihydrothieno[3,4-b][1,4]dioxepine), poly(2-decyl-2,3-dihydrothieno[3,4-b][1,4]dioxepine), poly(2-tetradecyl-2,3-dihydrothieno[3,4-b][1,4]dioxepine), poly(2-phenyl-2,3-dihydrothieno[3,4-b][1,4]dioxepine), poly(3,3-dimethyl-3,4-dihydro-2H-thieno[3,4-b][1,4]dioxepine), poly(3,3-diethyl-3,4-dihydro-2H-thieno[3,4-b][1,4]dioxepine), poly(3,3-dibutyl-3,4-dihydro-2H-thieno[3,4-b][1,4]dioxepine), poly(3,3-dioctyl-3,4-dihydro-2H-thieno[3,4-b][1,4]dioxepine) and poly(dibenzylpropylenedioxythiophene).

In an aspect of this invention, the anodically coloring substance comprises indium hexacyanoferrate.

In an aspect of this invention, the anodically coloring substance comprises a compound selected from the group consisting of transition metal hexacyanometallates.

In an aspect of this invention the anodically coloring substance comprises a compound selected from the group consisting of iron hexacyanoferrate (Prussian Blue), titanium hexacyanoferrate, vanadium hexacyanoferrate, chromium hexacyanoferrate, cobalt hexacyanoferrate, nickel hexacyanoferrate, copper hexacyanoferrate, zinc hexacyanoferrate, palladium hexacyanoferrate, molybdenum hexacyanoferrate, platinum hexacyanoferrate, iron hexacyanocobaltate, iron hexacyanoruthenate, iron hexacyanoosmate and ruthenium hexacyanoruthenate.

In an aspect of this invention, the anodically coloring substance comprises iron hexacyanoferrate (Prussian Blue).

In an aspect of this invention, the electrolytic layer comprises a liquid, a gel or a solid.

In an aspect of this invention, the electrolytic layer is a liquid and comprises one or more solvents and one or more ionically conductive salts.

In an aspect of this invention, the electrolytic layer is a gel and comprises one or more solvents, one or more ionically conductive salts and one or more gel-forming polymers, which may be uncross-linked or partially cross-linked.

In an aspect of this invention, the electrolytic layer is a solid and comprises one or more solvents, one or more ionically conductive salts and one or more highly cross-linked polymers.

In an aspect of this invention the solvent is selected from the group consisting of ethylene carbonate, propylene carbonate, acetonitrile, propionitrile, glutaronitrile, methoxyacetonitrile, γ-butyrolactone, polyethylene glycol and mixtures thereof.

In an aspect of this invention, the ionically conductive salt is selected from the group consisting of $LiClO_4$, $LiBF_4$, $LiAsF_6$, $LiI$, $LiPF_6$, $LiCl$, $LiSO_3CF_3$, $LiN(SO_2CF_3)_2$ $_{NaClO4}$, $NaBF_4$, $NaAsF_6$, $NaI$, $KClO_4$, tetra-n-butylammonium iodide, tetramethylammonium fluoroborate, tetraethylammonium fluoroborate, tetra-n-butylammonium fluoroborate, tetraethylammonium perchlorate, tetra-n-butylammonium perchlorate, polystyrene sulfonate sodium salt and mixtures thereof.

In an aspect of this invention, the polymer is selected from the group consisting of uncross-linked or lightly cross-linked polymethacrylate, poly(methyl methacrylate), polyacrylonitrile, polyethylene oxide, poly(hydroxyethyl methacrylate) and polyurethane.

In an aspect of this invention, the polymer is selected from the group consisting of highly cross-linked polymethacrylate, poly(methyl methacrylate), polyacrylonitrile, polyethylene oxide, poly(hydroxyethyl methacrylate) and polyurethane.

In an aspect of this invention, the polymer is cross-linked using a cross-linker selected from the group consisting of neopentyl glycol, dimethacrylate, ethylene glycol dimethacrylate, trimethylolpropane, tetraethylene glycol diacrylate and polyethylene glycol dimethacrylate.

In an aspect of this invention, the first conductive layer is at a voltage of from about −1.0 volts to about −3.0 volts relative to the second conductive layer to effect switching of the device to a low transmittance state.

In an aspect of this invention, the first conductive layer is at a voltage of from about −1.2 volts to about −1.8 volts relative to the second conductive layer.

In an aspect of this invention, the first conductive layer is at a voltage of from about +0.3 to about +1.5 volts relative to the second conductive layer to effect switching of the device to a high transmittance state.

In an aspect of this invention, the first conductive layer is at a voltage of from about +0.3 to about +0.8 volts relative to the second conductive layer.

In an aspect of this invention, the charge capacity of the cathodic coloring polymer is from about 5 to about 100 $mC/cm^2$ and the charge capacity of the anodic coloring substance is from about 0.5 to about 50 $mC/cm^2$.

In an aspect of this invention, the charge capacity of the cathodic coloring polymer is from about 12.5 to about 37.5 $mC/cm^2$ and the charge capacity of the anodic coloring substance is from about 1.0 to about 10 $mC/cm^2$.

In an aspect of this invention, the cathodic coloring polymer and the anodic coloring substance have a charge capacity ratio of from about 0.5 to about 3.0.

In an aspect of this invention, the cathodic coloring polymer and the anodic coloring substance have a charge capacity ratio of from about 0.5 to about 1.5.

In an aspect of this invention, the complementary electrochromic device further comprises a first transparent substrate layer in contact with the first conductive layer; and, a second transparent substrate layer in contact with the second conductive layer, wherein the first and second transparent substrate layers may be the same or different.

In an aspect of this invention, the first and second transparent substrates are independently selected from the group consisting of a glass, a transparent mineral, a transparent flexible natural, semi-synthetic or synthetic polymer and a transparent rigid natural, semi-synthetic or synthetic polymer.

In an aspect of this invention, the first and second transparent substrates are independently selected from the group consisting of a polyamide, a polyimide, a polyester, a polyethylene terephthalate, a polycarbonate, a polyacrylate, a polymethacrylate, a polystyrene, a polyolefin, a polyurethane, a polyacrylamide, a polymethacrylamide, a polyarylate and a polyfluorocarbon.

DETAILED DESCRIPTION OF THE INVENTION

Discussion

Figure 1:
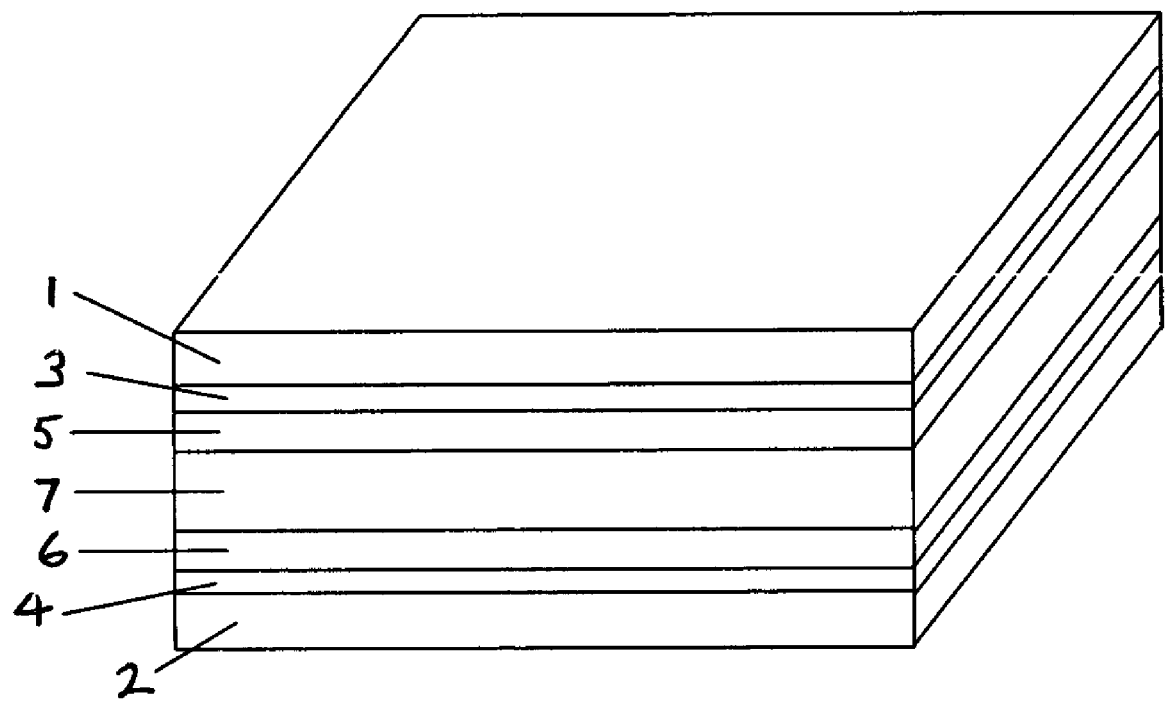
FIG. 1 is a schematic representation of an ECD of this invention. It is comprised of two transparent substrate layers, 1 and 2, two conducting or "electrode" layers, 3, and 4, two electrochromic layers 5 and 6 and an electrolyte layer 7. It is understood that this representation is illustrative only and is not intended, nor is it to be construed, as limiting the scope of this invention in any manner whatsoever. Those skilled in the art will readily recognize other configurations including, without limitation, differences in the number and position of the various layers based on the disclosures herein. All such variations are within the scope of this invention.

FIG. 1 illustrates a representative embodiment of this invention. It is not intended, nor should it be construed as limiting the scope of this invention in any manner whatsoever. For instance, while FIG. 1 shows a seven-layer device, fewer or more layers may be included. Fewer layers might involve combining the purposes of two or more layers, for example, one or both substrate layers might also be configured to serve as conducting layers. Or a third complementary electrochromic layer might be added to further improve the operational characteristics of the device or to provide different colors in the darkened state. Other variations will become apparent to those skilled in the art and are within the scope of this invention.

In FIG. 1, two transparent substrate layers, 1 and 2, are shown. These substrate layers may be rigid, semi-flexible or flexible. Substances from which the substrate layers may be formed include, without limitation, such materials as glasses, transparent minerals such as quartz and transparent natural, semi-synthetic or synthetic polymers. An example of a natural polymer that might be used is, without limitation, cellulose. Synthetic polymers that might be used include, without limitation, polyolefins, polyimides, polyamides, polyurethanes, polystyrenes, polyacrylates, polymethacrylates, polyacrylamides, polymethacrylamides, polyesters, polyarylates, polycarbonates, polyfluorocarbons, polyethylene terephthalate and the like. The polymers may be formed from a single monomer or using multiple different monomers to create random or block copolymers.

Adjacent to the substrate layers in FIG. 1 are two conducting layers, 3 and 4. Normally, one of these layers is transparent while the other may be transparent, translucent, opaque or reflective depending on the intended application. The conducting layer may comprise, without limitation, metals, metal oxides, doped metal oxides, doped polymers and conducting polymers. Examples of metal oxides that can be employed are tin oxide, indium-tin oxide and zinc oxide. Doped oxides, that is oxides in which a relatively small amount of another material is interspersed to improve the conducing capability of the layer, include, again without limitation, antimony-doped zinc oxide and fluorine-doped tin oxide. An example of a doped polymer would be iodine-doped polyacetylene. Conductive polymers include, without limitation, polypyrrole, polyaniline and poly(3,4-ethylenedioxythiophene)/polystyrene sulfonate. If it is desired that one of the conducting layers of the device of this invention be reflective, that conducting layer may comprise, without limitation, deposited silver, copper, aluminum, gold, platinum or palladium.

In electrical contact with one of the conducting layers, layer 3 for instance, is a cathodically coloring polymer layer. The anodically coloring substance layer is in contact with the other conducting layer, layer 4. Between the two layers is an electrolyte layer, which is discussed below. When a negative voltage is applied to layer 3 relative to layer 4, the cathodically coloring polymer converts to its colored or low transmissivity state and, essentially simultaneously, the anodically coloring substance converts to its colored or low transmissivity state. When the field is reversed, that is, when a positive voltage is applied to conducting layer 3 relative to layer 4, the cathodically coloring polymer reverts to its colorless/lightly-colored or high transmissivity state. As noted previously, the cathodically colored compound of this invention has the structure:

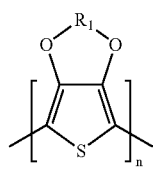

wherein $R_1$ is selected from the group consisting of [—CH$_2$—]$_r$, —CH$_2$CH(R$_2$)— and —CH$_2$C(R$_3$)(R$_4$)CH$_2$—; r is 1, 2, 3, or 4; n is the number of repeat monomer units in the polymer; $R_2$ is selected from the group consisting of branched or straight-chain (1C-20C)alkyl, hydroxy(1C-20C)alkyl, methoxy(1C-20C)alkyl and phenyl; $R_3$ and $R_4$ are independently selected from the group consisting of branched or straight-chain (1C-10C)alkyl and phenyl.

The number of repeating monomer units, n, may be any number that provides a polymer with the required degree of conductivity and includes those n values found in commercial poly(3,4-ethylenedioxythiophene)s. Other usable n values will be apparent to those skilled in the art based on the disclosures herein.

As used herein, "Alkyl" refers to a aliphatic hydrocarbon and (1C-XC) refers to all structural permutations of all the aliphatic hydrocarbons consisting of from 1 to X carbon atoms. For example, a (1C-4C)alkyl group would refer to a $CH_3$—, a $CH_3CH_2$—, a $CH_3CH_2CH_2$—, a $CH_3CH(CH_3)$—, a $CH_3CH_2CH_2CH_2$—, and a $(CH_3)_3C$-group.

As used herein "hydroxy" refers to an —OH group and "methoxy" refers to a $CH_3O$— group.

A "phenyl group" refers to a benzene ring that is covalently bonded to another entity.

Between and in contact with both the cathodically coloring polymer layer and the anodically coloring substance layer is an electrolyte layer. The electrolyte in the present invention comprises at least two components, one or more ionically conducting salts and one or more solvents. Examples of solvents that can be used in a device of this invention include, without limitation, propylene carbonate, ethylene carbonate, acetonitrile, propionnitrile, glutarontrile, methoxyacetonitrile, γ-butyrolactone, polyethylene glycol, and mixtures thereof. Examples, without limitation of ionically conductive salts include $LiClO_4$, $LiBF_4$, $LiAsF_6$, LiI, $LiPF_6$, LiCl, $LiCF_3SO_3$, $LiN(SO_2CF_3)_2$, $NaClO_4$, $NaBF_4$, $NaAsF_6$, polystyrene sulfonate sodium salt (PSSNa), NaI, $(n-C_4H_9)NI$, $KClO_4$, $(CH_3)_4NBF_4$, $(C_2H_5)_4NBF_4$, $(n-C_4H_9)_4NBF_4$, $(C_2H_5)_4NClO_4$, $(n-C_4H_9)_4NClO_4$ and mixtures thereof. The salt concentration is in the range of 0.01 M to 1.5 M, preferably from 0.1 M to 1.0 M. If the electrolyte layer is comprised mostly of solvent and ionically conductive salts, the electrolyte layer is a liquid. An ECD comprising such a liquid electrolyte layer requires a seal to keep the liquid between the electrochromic layers. If the electrolyte layer additionally comprises an uncross-linked or lightly cross-linked polymer as a thickener, the electrolyte layer becomes a gel. Finally, if the electrolyte layer comprises a highly cross-linked polymer, the electrolyte layer becomes a solid. Examples, without limitation, of polymers that can be used in a device of this invention are poly(methyl methacrylate), polyacrylonitrile, polyethylene oxide, poly(hydroxyethyl methacrylate), and polyurethane. These polymers can be used in their uncross-linked state or they can be lightly or heavily cross linked. Examples, without limitation, of crosslinkers inlcude neopentylglycol dimethacrylate, ethylene glycol dimethacrylate, trimethylolpropane, tetraethylene glycol diacrylate, and polyethylene glycol dimethyacrylate. Photoinitiators for the reactions are well-known to those skilled in the art and include, without limitation, benzoin methyl ether and 2,2'-azobisisobutyronitrile.

The substance used as the anodically coloring substance is selected from the group consisting of indium hexacyanometallates and transition metal hexacyanometallates, as represented by the following general formula:

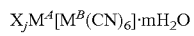

$$X_jM^A[M^B(CN)_6]\cdot mH_2O$$

wherein X is a monovalent cation to provide overall charge balance; $M^A$ is indium or a transition metal and $M^B$ is a transition metal with a different formal oxidation number than $M^A$. The letter j represents a stoichiometric subscript. The subscript m represents the number of water molecules associates with one molecule of the transition metal methal hexacyanometallate. Examples, without limitation of transition metal hexacyanometallates useful in the devices of this invention include: $(M^A, M^B)$=(Fe, Fe) (iron(III) hexacyanoferrate(II), Prussian blue), (Ti, Fe), (V, Fe), (Cr, Fe), (Co, Fe), (Ni, Fe), (Cu, Fe), (Zn, Fe), (Mo, Fe), (Pd, Fe), (Pt, Fe), (Fe, Co), (Fe, Ru), (Fe, Os), and (Ru, Ru).

The cathodically coloring polymer of this invention is deposited onto one of the conductive layers. One of the conductive layers is normally transparent and the other may be transparent, translucent, opaque or reflective. Deposition is achieved by a potentiostatic or galvanostatic procedure using a charge capacity of from about 5 to about 100 $mC/cm^2$, preferably at present from about 12.5 to about 37.5 $mC/cm^2$.

The complementary anodically coloring substance, that is, the indium hexacyanometallate or transition metal hexacyanometallate is deposited onto the other conductive layer also by a potentiostatic or galvanostatic procedure using a charge capacity from about 0.5 to about 50 $mC/cm^2$, preferably at present from about 1 to about 10 $mC/cm^2$.

As used herein, the word "about" means that the number indicated to be "about" may vary from the actual figure by an amount that one skilled in the art would consider to be within the scope of the given number. In general, "about" means at least ±15%.

As used herein, a "gel" refers to a substance in a jelly-like state, that is, like petroleum jelly or Jello®. Gels are generally formed by the coagulation of colloidal liquids wherein the colloidal material constitutes a polymer or polymeric mixture. Often the polymer(s) is/are in the form of fibrous matrices, the interstices of which contain a liquid or liquids. The polymer(s) may be uncross-linked or lightly cross-linked. Gels tend to be viscoelastic rather than simply viscous in that they can resist some mechanical stress without undergoing deformation.

As used herein, to be "lightly cross-linked" refers to a polymer that has undergone sufficient cross-linking to form a gel from a colloidal suspension of the polymer in a liquid. Those skilled in the art will readily be able to determine how much cross-linking is required to render a colloidal polymer gel-like based on the disclosures herein.

As used herein, to be "heavily cross-linked" refers to a polymer that has undergone sufficient cross-linking to give it the characteristics of a solid, that is a composition that may be inelastic or elastic but is not viscoelastic. Again, those skilled in the art will be readily able to determine how much cross-linking is required to render a particular polymer a "solid" rather than a gel.

To assemble a device of this invention, the two electrochromic layers are pretreated using cyclic voltammetry in electrolytes under a nitrogen gas atmosphere in order to ensure proper ion insertion and extraction. In addition, cyclic voltammetry is used to determine the optimal charge capacity of the two electrochromic electrodes. The charge capacity ratio is defined as the charge capacity of anodic substance over the charge capacity of the cathodic substance. The charge capacity ratio is presently preferred to be in the range of about 0.5 to about 3.0, even more preferably about 0.75 to about 1.5, in order to obtain the largest transmittance modulation. After assembly, the operational voltages of the electrochromic device are carefully controlled to obtain optimal performance of the system. The coloring voltages (cathodic coloring polymer relative to anodic coloring substance) are controlled in the range of from about −1.0 V to −3.0 V, preferably at present from about −1.2 V to about −1.8 V; the bleaching voltages are controlled in the range of from about +0.3 V to about +1.5 V, preferably at present from about +0.3 V to about +0.8 V.

EXAMPLES

Example 1

Deposition of the Prussian Blue Thin-film onto the Transparent ITO Glass

A three-electrode electrochemical cell was used to deposit Prussian Blue (PB) thin films on optically transparent ITO glass substrates ($R_{sh}$=20 Ω/sq., Ritek Corporation, Hsinchu, Taiwan). The ITO glass substrate was used as the working electrode; a platinum plate counter-electrode and an Ag/AgCl saturated KCl reference electrode were also used. The PB thin-film electrodes were galvanostatically deposited by applying a cathodic current density of 20 μA/cm² to the ITO glass substrates. The composition of the plating solution was 10 mM $FeCl_3.6H_2O_{(aq)}$, 10 mM $K_3Fe(CN)_{6\,(aq)}$, 0.1 M $KCl_{(aq)}$, and 0.1 M $HCl_{(aq)}$. The deposition time was 90, 120, 150, 180, 210, and 240 seconds, respectively. The as-deposited PB electrodes were rinsed with deionized water, dried under $N_2$, and then stored in air. The as-deposited PB electrodes were blue in color.

Example 2

Deposition of Poly(3,4-ethylenedioxythiophene) (PEDOT) and Poly(3,3-dimethyl-3,4-dihydro-2H-thieno[3,4-b][1,4]dioxepine) (PProDOT-Me$_2$) Thin-film onto the Transparent ITO Glass The PEDOT and PProDOT-Me$_2$ thin films were electropolymerized on the ITO glass substrates by the potentiostatic method. A potential of 1.2 V (vs. Ag/Ag$^+$ (0.01 M AgNO$_3$, 0.1 M (n-C$_4$H$_9$)$_4$NClO$_4$ in MeCN)) was applied to the ITO substrate until 25 mC/cm² had passed to control the film thickness. The deposition solution was composed of 0.01 M EDOT monomer and 0.1 M LiClO$_4$ in acetonitrile (MeCN). The as-deposited PEDOT and PProDOT-Me$_2$ thin-film electrodes were rinsed with MeCN and dried in air prior to use. The as-deposited PEDOT thin-film electrodes were sky blue in color. The as-deposited PProDOT-Me$_2$ thin-film electrodes were essentially colorless.

Example 3

Preparation of a Gel Electrolyte

A gel polymer electrolyte was prepared based on poly (methyl methacrylate) (PMMA) polymer. 1.06 g LiClO$_4$ salt was dissolved in 10 ml propylene carbonate (PC), and then 1.18 g PMMA powder was added. The solution was heated with stirring until a viscous transparent gel formed.

Example 4

ECD Assembly

An ECD was assembled using PEDOT (or PProDOT-Me$_2$) as the cathodically coloring polymer layer and PB as the anodically coloring substance layer and PMMA-based gel polymer as the electrolyte layer. Assembly was performed under a N$_2$ atmosphere. Before assembly, both layers were cycled several times using cyclic voltammetry (CV) in 1 M LiClO$_4$/propylene carbonate solution under a N$_2$ atmosphere in order to ensure proper ion insertion and extraction. After cycling, the PEDOT (or PProDOT-Me$_2$) layer was stepped to a doping state by applying 0.3 V (vs. Ag/Ag$^+$) for 60 seconds. The PB layer was stepped to its colorless state by applying −0.9 V (vs. Ag/Ag$^+$) for 60 seconds. Following this pretreatment, the transparent gel polymer electrolyte was poured onto the PEDOT(or PProDOT-Me$_2$) layer and the PB layer was placed on top. The three layers were then carefully sandwiched together to form an electrochromic cell. Finally the cell was sealed with a Torr Seal® around the four edges of the ITO glass. The assembled device is essentially that shown in FIG. 1.

Example 5

Switching Speed

Figure 2:
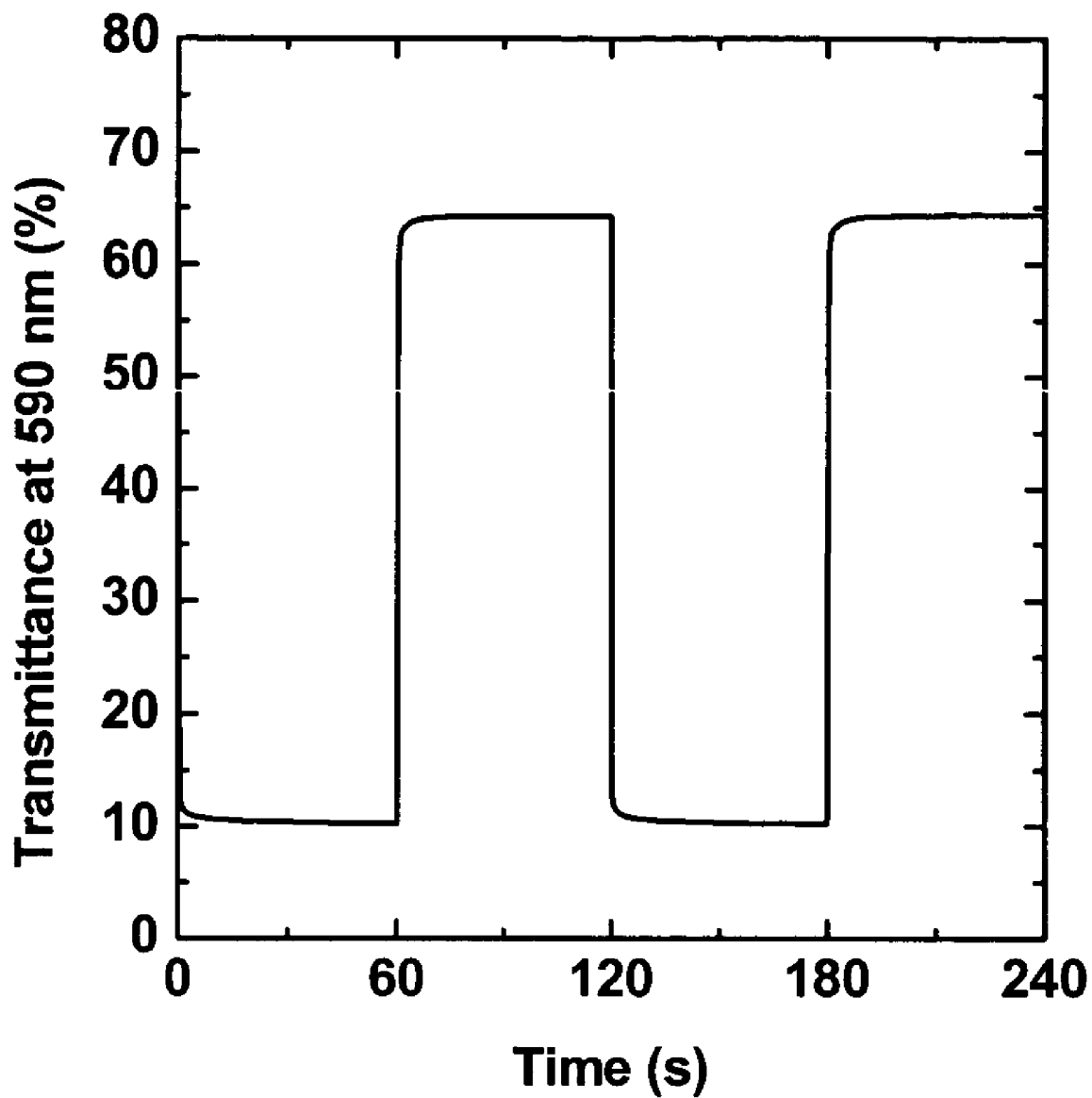
FIG. 2 is a graphic representation of the transmittance response of an ECD of FIG. 1 in which the cathodic species is poly(3,4-ethylenedioxythiophene) or a derivative thereof and the anodic species is Prussian Blue.

The ECD assembled with PEDOT and PB as described in Example 4 was examined electrochemically and spectrally. The transmittance response of the ECD is shown in FIG. 2. The coloring voltage was −1.5 V (PEDOT vs. PB), the bleaching voltage was 0.6 V and the switching step was 60 seconds. The transmittance in the colored state was 10% and the transmittance in the bleached state was 64%. The transmittance window was, therefore, 54%. The switching time, defined as the time required to achieve a 95% change in transmittance, was 0.7 second for bleaching and 0.5 second for coloring.

Example 6

Long-term Continuously Cycling Tests

Figure 3:
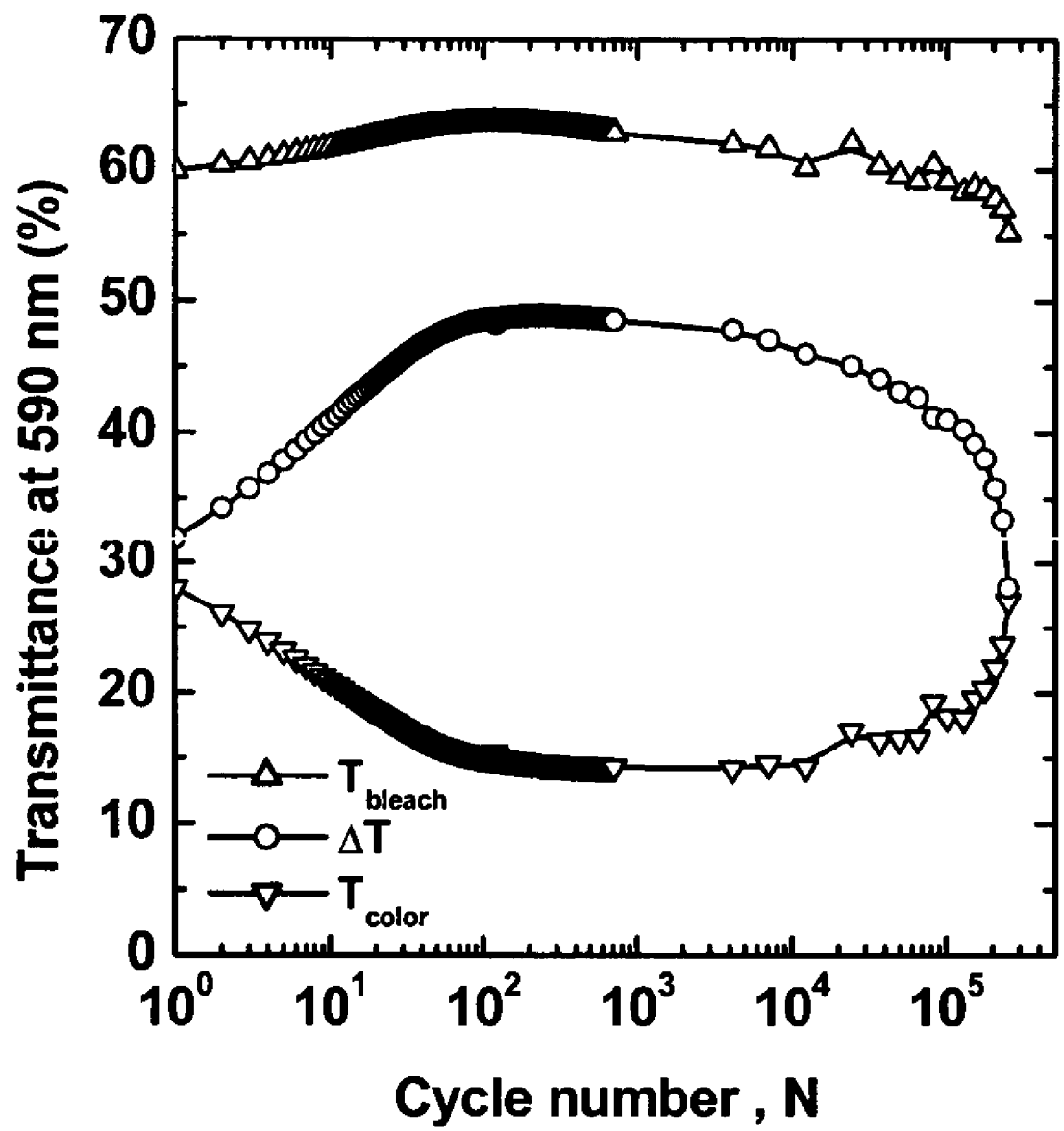
FIG. 3 is a graphic representation of the stability of the ECD of FIG. 2 under long-term continuous cycling between transmittance states.

Another ECD, assembled using the same components as in Example 5, was subjected to long-term continuous cycling to examine its cycling stability. The transmittances of the ECD, which had a charge capacity ratio of 0.8, as a function of cycling are shown in FIG. 3. The coloring voltage was −1.5 V (PEDOT vs. PB), the bleaching voltage was 0.6 V (PEDOT vs. PB), and the switching step was 10 seconds. The device exhibited a maximum transmittance window of 49%. A color change with voltage switch was apparent up to 250,000 cycles, demonstrating the excellent long-term cycling stability of an ECD of this invention.

Example 7

Figure 4:
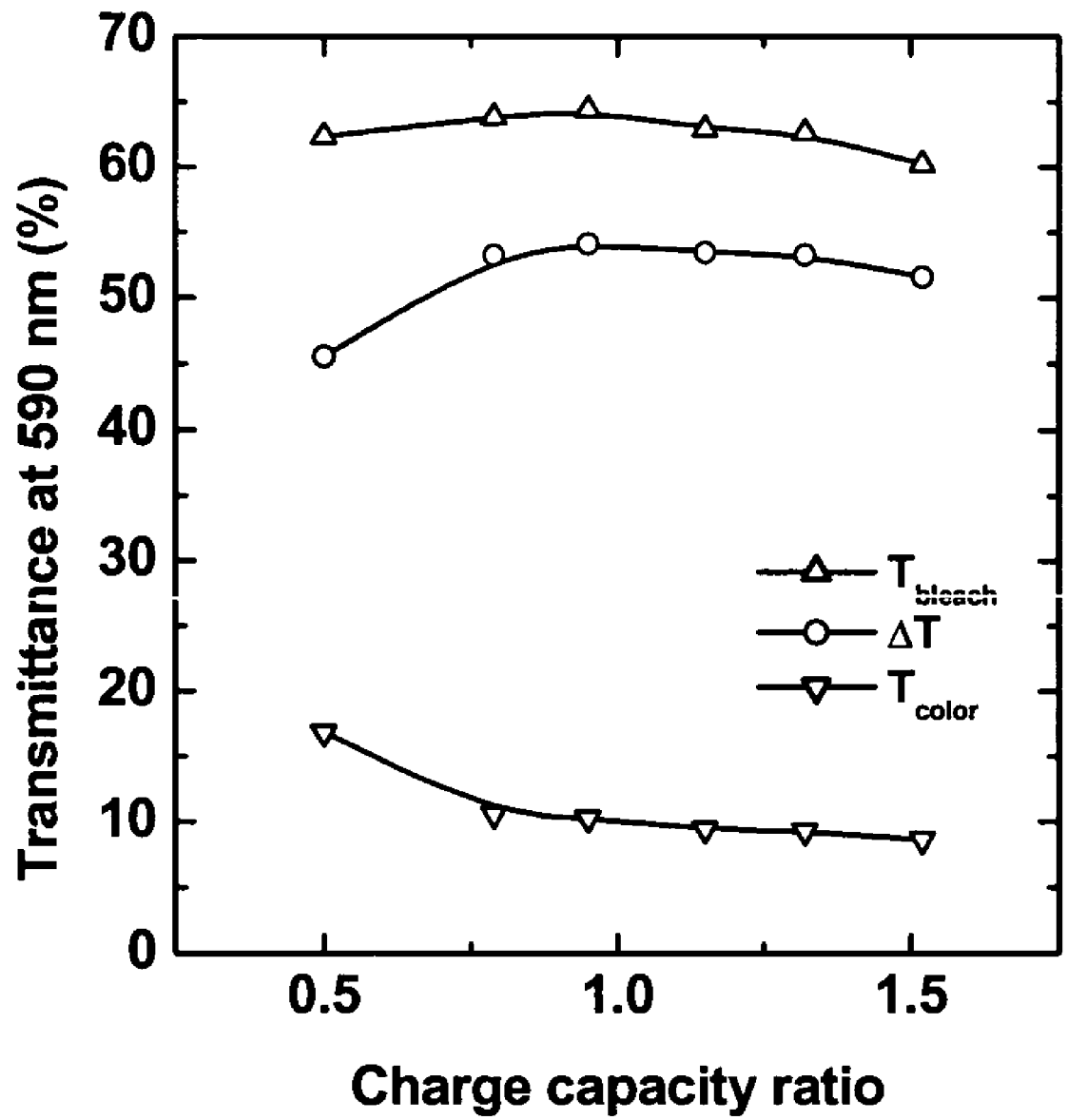
FIG. 4 is a graphic representation of the transmittance of the ECD of FIG. 2 in the bleached state and the colored state over a range or charge capacity ratios. It also shows the calculated transmittance window based on the previous numbers.
Figure 5:
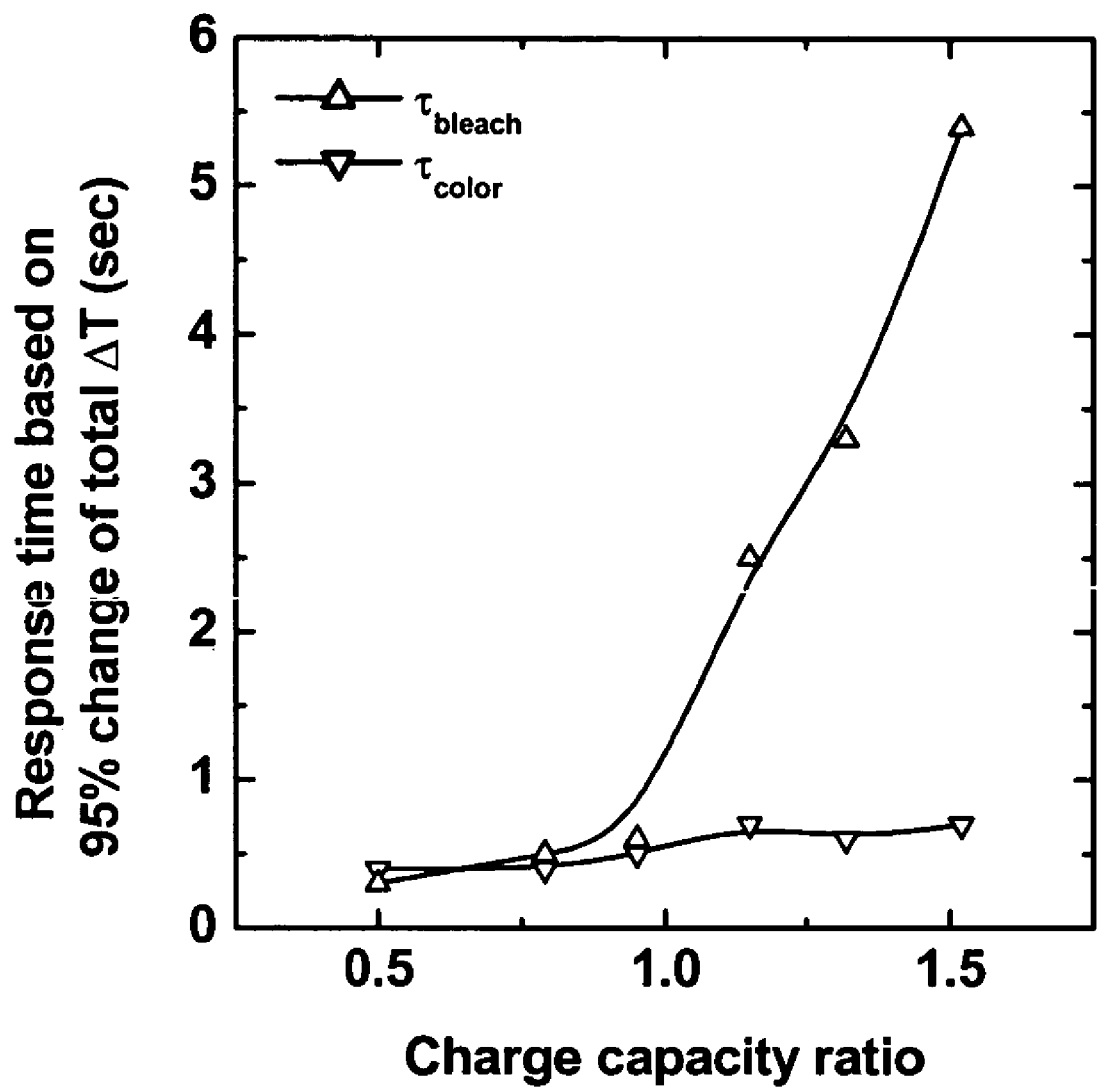
FIG. 5 is a graphic representation of the switching speed of the ECD of FIG. 2 as a function of charge capacity ratio.

Effect of the Charge Capacity Ratio on the Transmittance Window and Switching Speed Six ECDs employing different charge capacity ratios for the two thin-film electrodes, were assembled by the method described in Example 4. The six devices were subjected to the same operating conditions as the ECD of Example 5. The transmittances windows and switching speeds of the six ECDs are shown in FIG. 4 and FIG. 5.

Example 8

Long-term At-rest Stability

Figure 6:
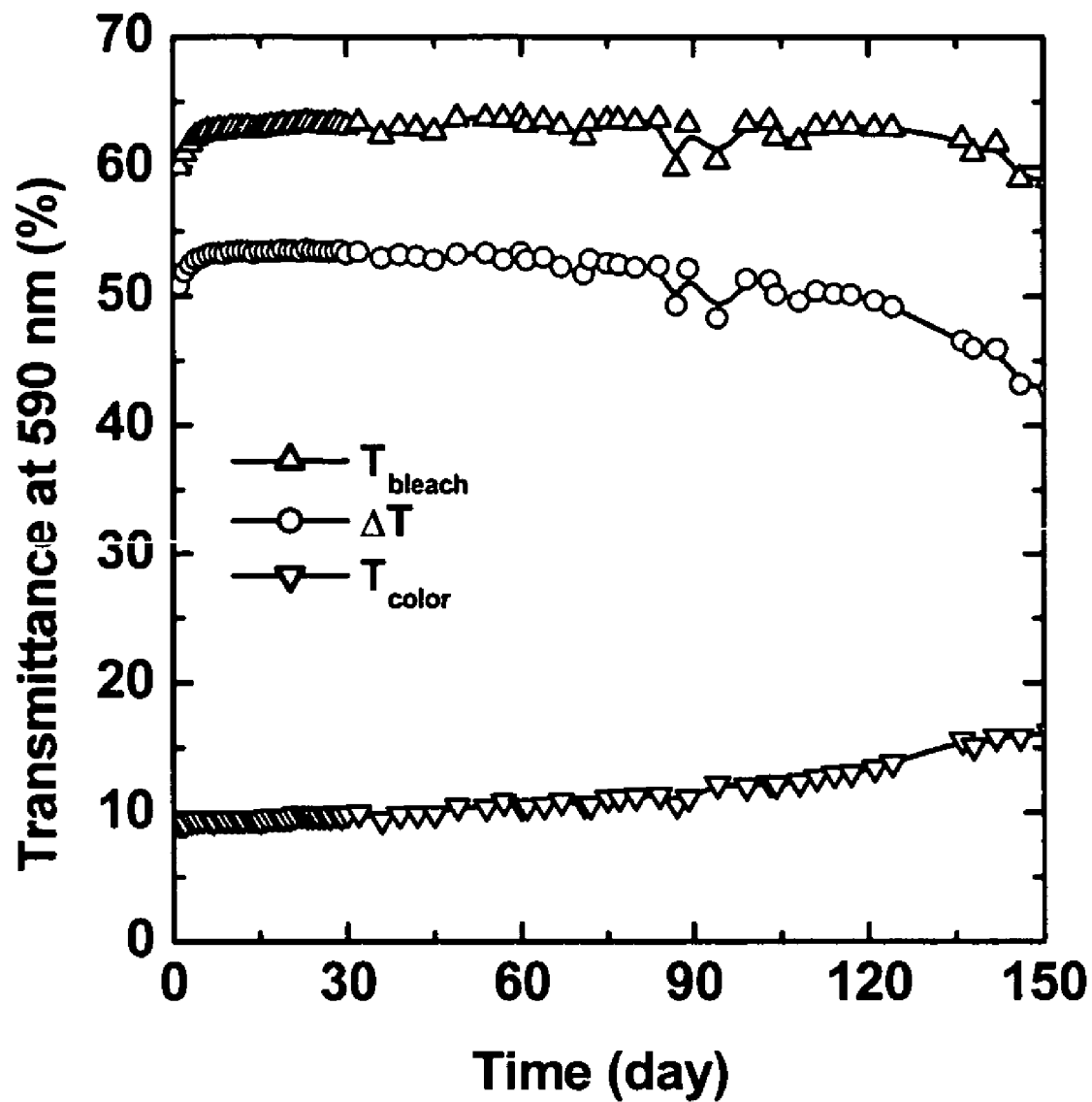
FIG. 6 is a graphic representation of the long-term at-rest stability of the ECD of FIG. 2.
Figure 7:
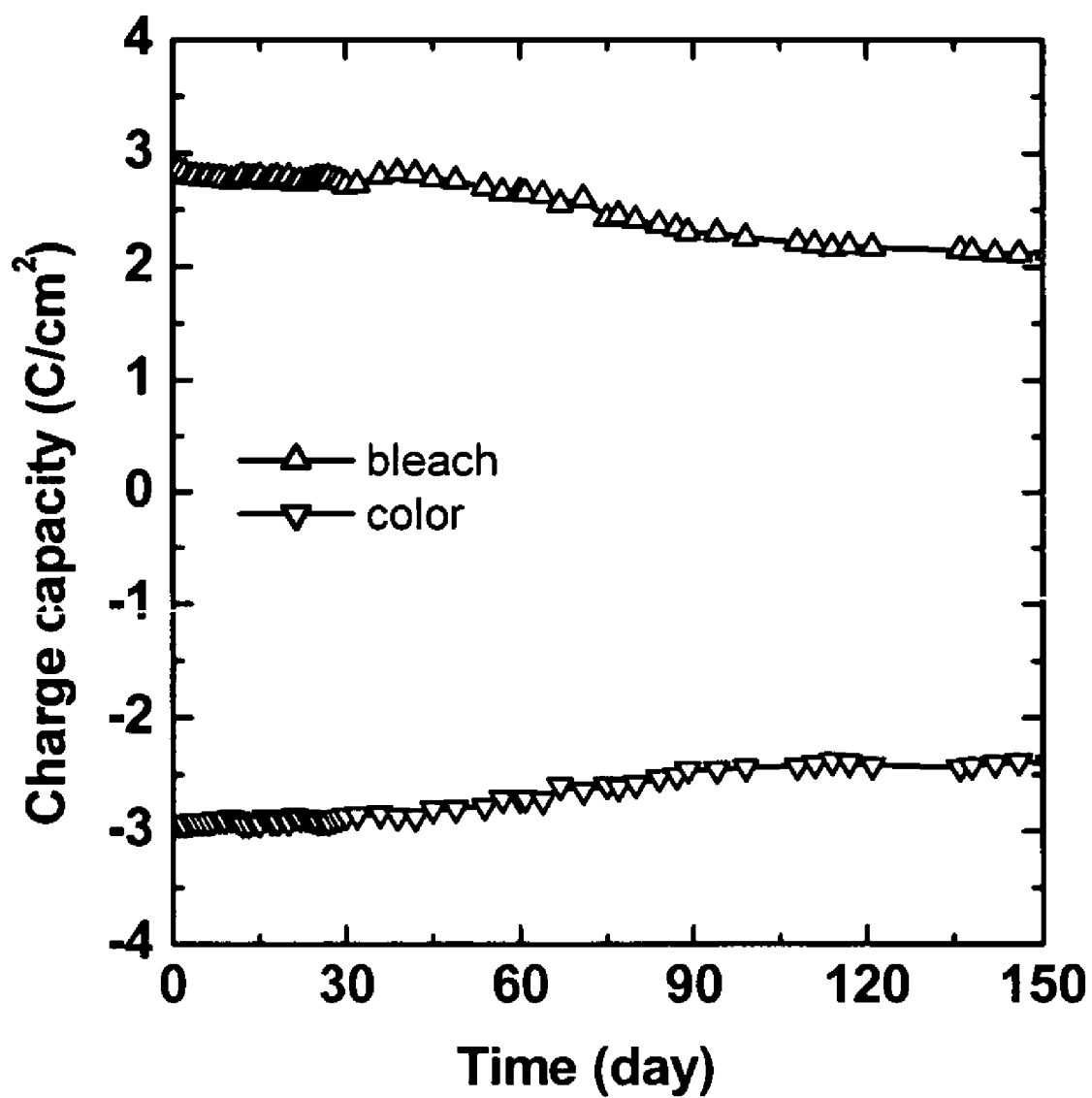
FIG. 7 is a graphic representation of the charge capacity decay over time in the at-rest state of the ECD of FIG. 2.

The long term at-rest stability of the six ECDs from Example 7 were examined. The ECDs were stepped twice each day using −1.5 V for 60 seconds for coloring and 0.6 V for 60 seconds for bleaching. The ECDs all remained in the bleached state while at-rest in air. FIG. 6 and FIG. 7 show the transmittance variation and charge capacity decay of the ECDs having a charge capacity ratio of 1.15. The maximum transmittance window among the devices was 53%. At 150 days, it dropped to 45%. Thus, the ECDs retained 85% of the maximum transmittance window after 150 days. In addition, the ECDs retained 82% and 75% of the initial charge capacity in the coloring and bleaching processes. Thus, the ECDs of this invention exhibit excellent long-term at-rest stability.

Figure 8:
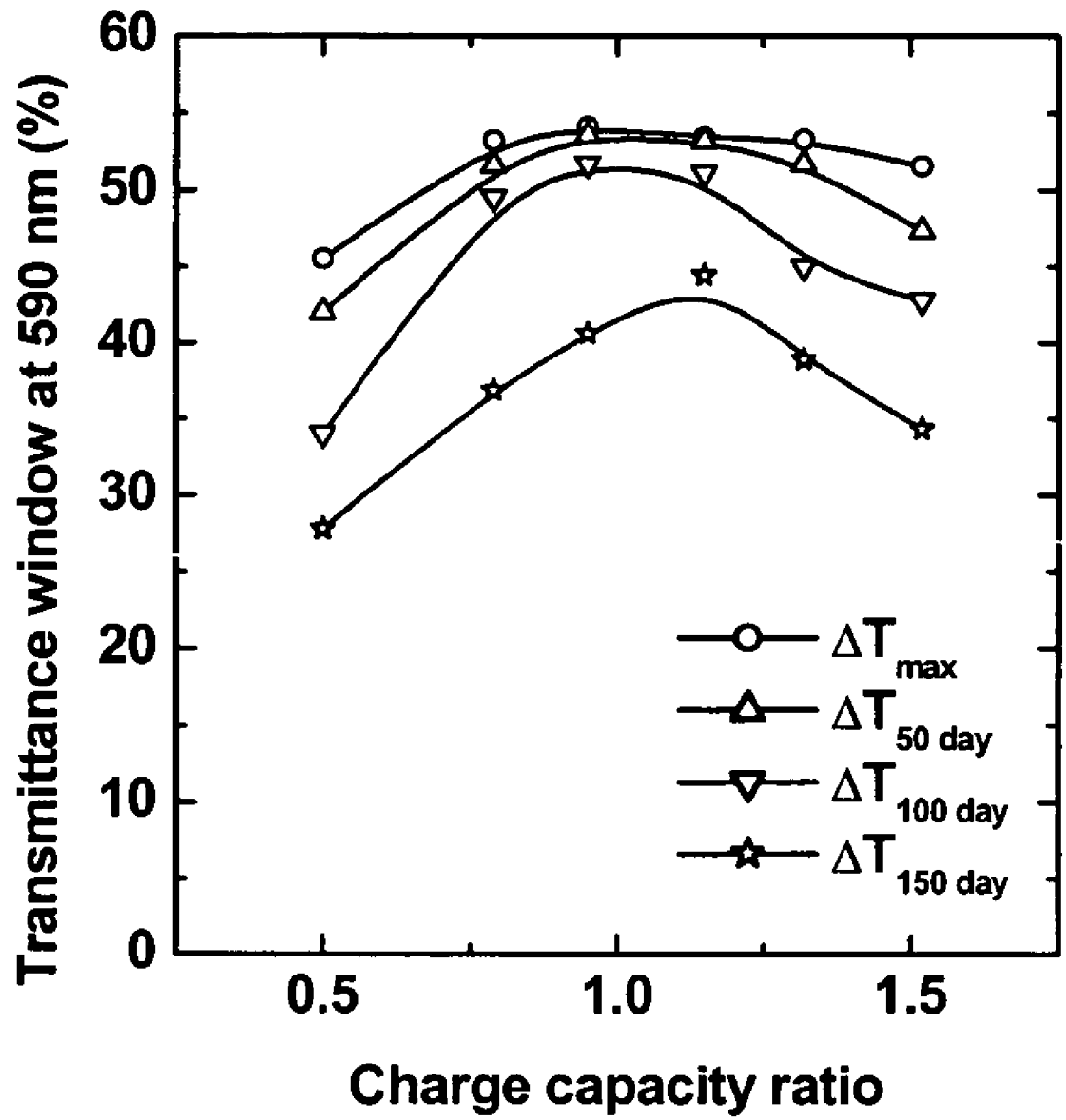
FIG. 8 is a graphic representation of the effect of time on the transmittance window of the ECD of FIG. 2 as a function of charge capacity ratio at different time intervals.

FIG. 8. shows the variance in transmittance window as a function of charge capacity ratio. As can be seen, loss in the transmittance window is related to deviation of the charge capacity ratio from approximately 1. Maximum stability for an ECD comprised of the test electrochromic substances of this invention was observed at a charge capacity ratio of 1.15.

Example 9

Switching Speed

Figure 9:
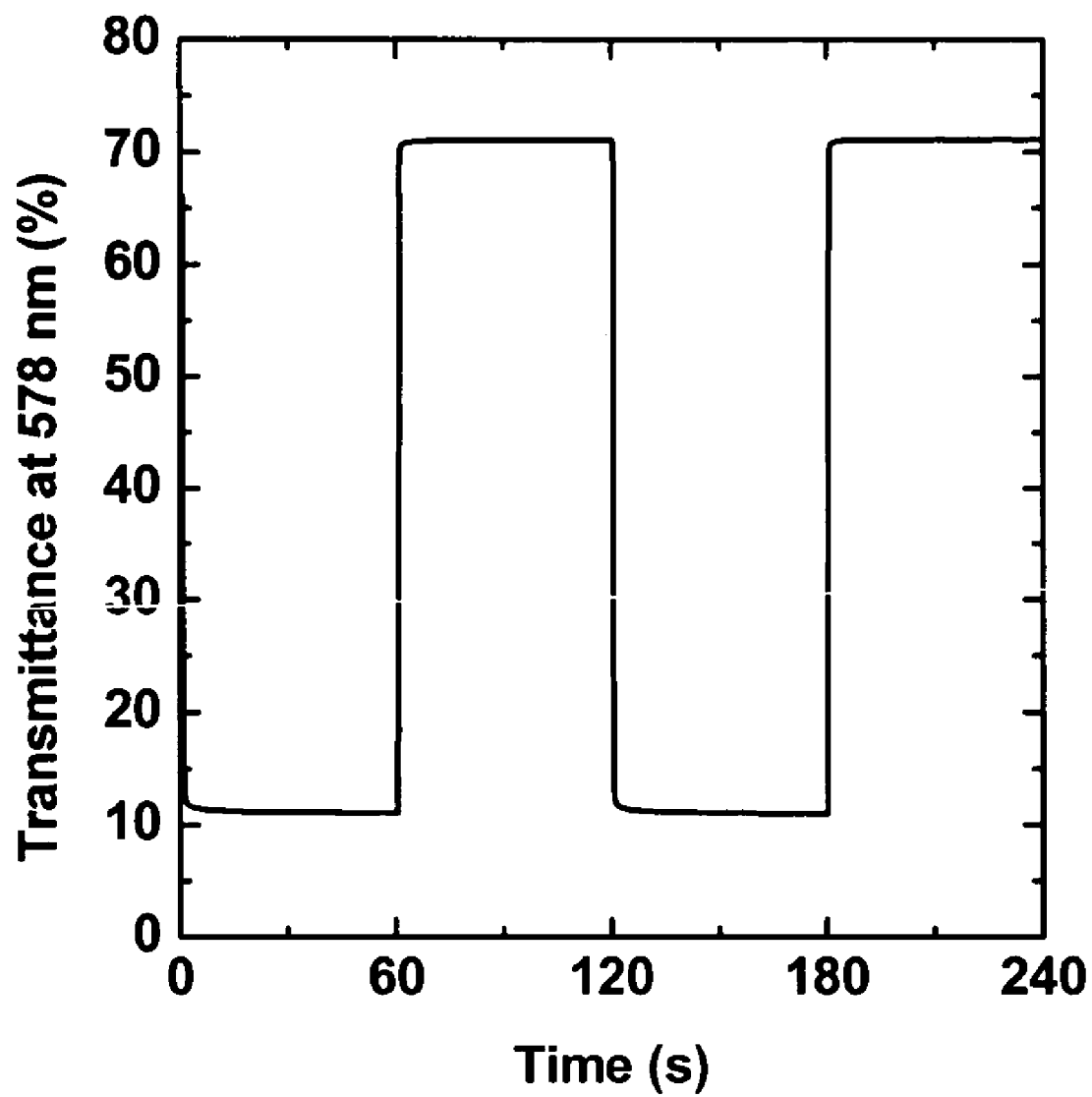
FIG. 9 is a graphic representation of the transmittance of an ECD of FIG. 1 in which the cathodic species is poly(3,3-dimethyl-3,4-dihydro-2H-thieno[3,4-b]-1,4-dioxepine) (PProDOT-Me$_2$) and the anodic species is Prussian Blue (PB).

The ECD of Example 4 assembled using PProDOT-Me$_2$ and PB was also examined electrochemically and spectrally. The switching response of the ECD is shown in FIG. 9. The coloring voltage used was −1.2 V (PProDOT-Me$_2$ vs. PB), the bleaching voltage was 0.8 V and the switching step was 60 seconds. The transmittance in the colored state was 11%; the transmittance in the bleached state was 71%, giving a transmittance window of 60%. The switching time, defined as above as the time required to achieve a 95% change in transmittance, was 0.4 seconds both for bleaching and coloring.

Example 10

Long-term Continuously Cycling Stability of the PProDOT-Me$_2$/PB ECD

Figure 10:
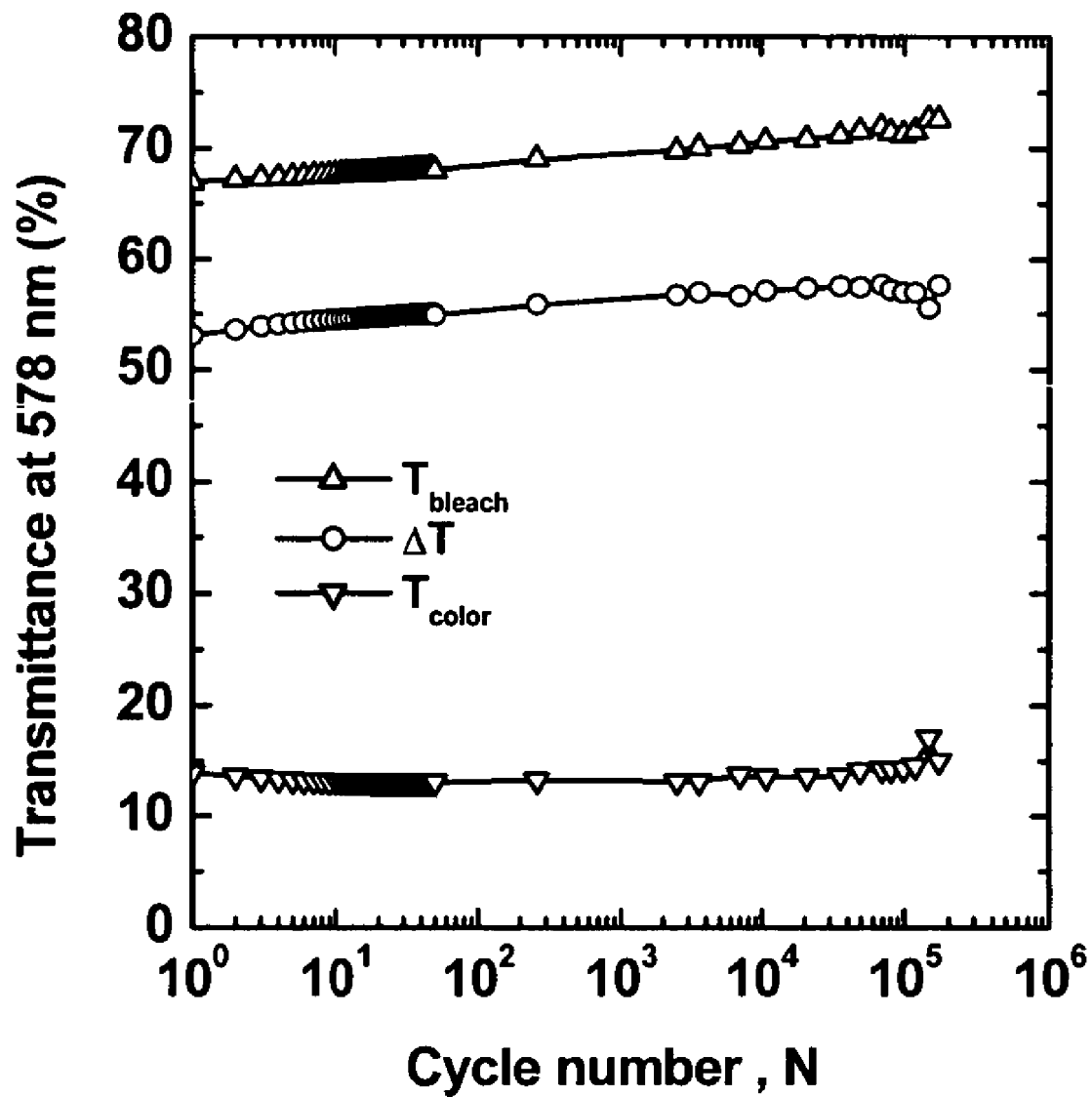
FIG. 10 is a graphic representation of cycling stability of the ECD of FIG. 9.

The stability of the ECD of example 9 under long-term continuously cycling was examined. The transmittance of the device as a function of cycle is shown in FIG. 10. The coloring voltage used was −1.2 V (PProDOT-Me$_2$ vs. PB), the bleaching voltage was 0.6 V and the switching step was 10 seconds. The ECD showed a maximum transmittance window of 58% which remained almost constant up to 170,000 cycles. Thus, ECDs comprising the electrochromic substances of this invention also have excellent long-term continuously cycling stability.

Example 11

Long-term At-rest Stability

Figure 11:
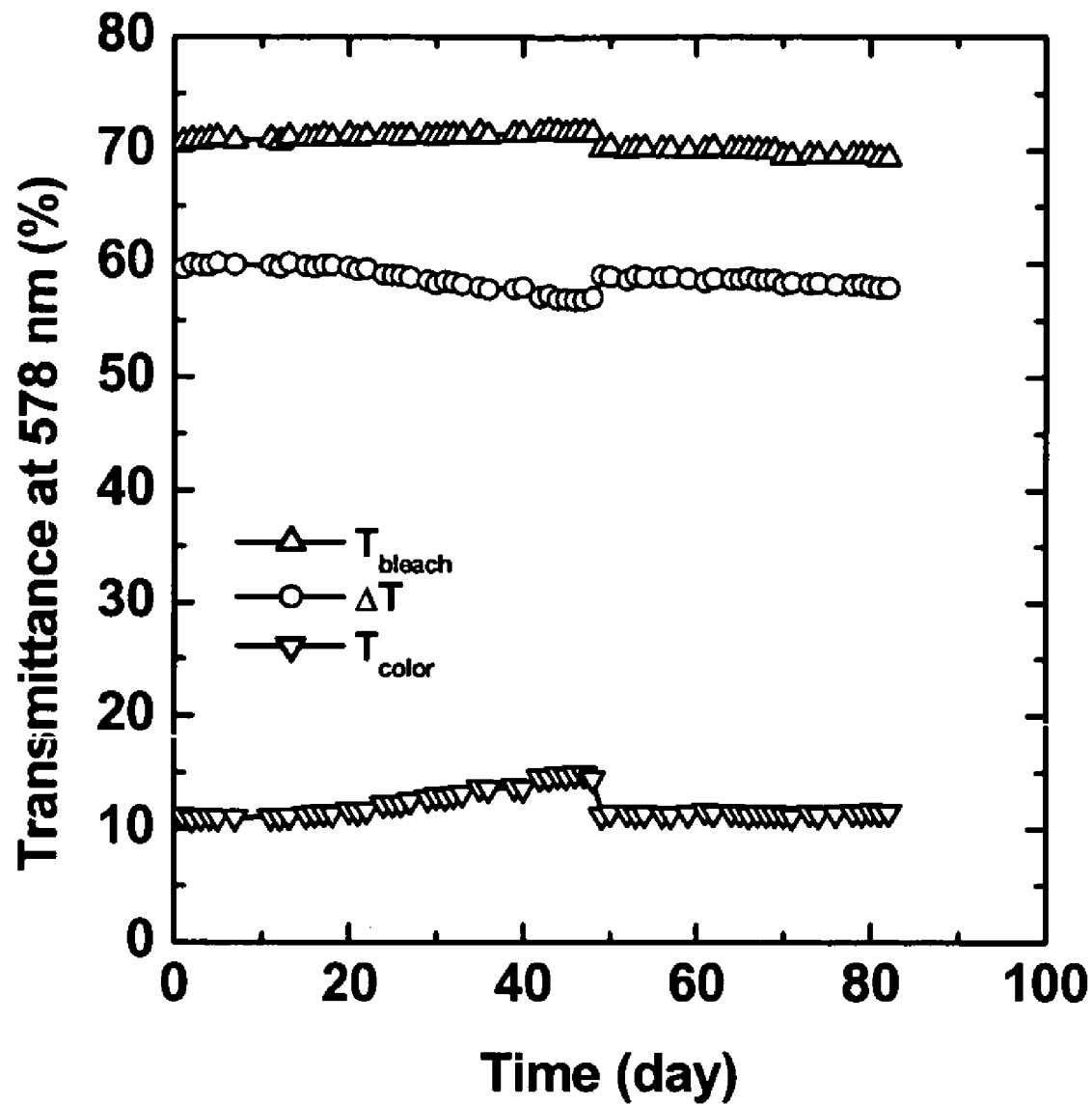
FIG. 11 is a graphic representation of the long-term at-rest stability of the ECD of FIG. 9.

The long-term at-rest stability of a PProDOT-Me$_2$/PB ECD similar to that described in Example 9 was examined. The ECD was stepped twice each day at −1.2 V for 60 seconds for coloring and 0.8 v for 60 seconds for bleaching for the first 50 days and then −1.5 V for 60 seconds for coloring and 0.6 V for 60 seconds for bleaching for the remainder of the test period. As above, the ECD remains in the bleached state when at-rest and exposed to the air. FIG. 11 shows the transmittance variation over the course of the study. The maximum transmittance window of the device was 60% and only decreased to 58% after 80 days for a remarkable 97% retention in transmittance. Thus, ECDs comprising the electrochromic substances of this invention exhibit outstanding long-term at-rest stability.

What is claimed:

1. A complementary electrochromic device, comprising:
a first conductive layer;
a second conductive layer, which may be the same as or different from the first conductive layer;
a cathodically coloring polymer layer in electrical contact with the first conductive layer;
an anodically coloring substance layer in electrical contact with the second conductive layer;
a transparent electrolyte layer positioned between and in contact with both the cathodically coloring polymer layer and the anodic coloring substance layer;
wherein:
upon application of a negative voltage to the first conductive layer relative to the second conductive layer, the cathodically coloring polymer layer and the anodically coloring substance layer are both in a low transmissivity state and upon application of a positive voltage to the first conductive layer relative to the second conductive layer, the cathodically coloring polymer and the anodically coloring substance layer are both in a high transmissivity state;
wherein:
the cathodically coloring polymer has the chemical structure:

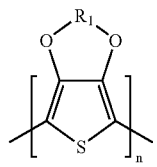

wherein:
R$_1$ is selected from the group consisting of [—CH$_2$—]$_r$, —CH$_2$CH(R$_2$)— and —CH$_2$C(R$_3$)(R$_4$)CH$_2$—;
r is 1, 2, 3, or 4;
n is the number of repeat monomer units in the polymer;
R$_2$ is selected from the group consisting of branched or straight-chain (1C-20C)alkyl, hydroxy(1C-20C)alkyl, methoxy(1C-20C)alkyl and phenyl;
R$_3$ and R$_4$ are independently selected from the group consisting of branched or straight-chain (1C-10C) alkyl and phenyl; and,
the anodically coloring substance comprises a chemical compound selected from the group consisting of an indium hexacyanometallate and a transition metal hexacyanometallate.

2. The complementary electrochromic device of claim 1, wherein the first and second conductive layers comprise one or more substances selected from the group consisting of a metal oxide, a doped metal oxide and a conducting polymer.

3. The complementary electrochromic device of claim 2, wherein the first and second conductive layers comprise one or more substances independently selected from the group consisting of tin oxide, indium-tin oxide, fluorine-doped tin oxide, zinc oxide, antimony-doped zinc oxide and poly(3, 4-ethylenedioxythiophene)/poly(styrene sulfonic acid).

4. The complementary electrochromic device of claim 1, wherein one of the conductive layers is transparent and the other conductive layer comprises a reflective deposited metal selected from the group consisting of silver, aluminum, copper, platinum, palladium and gold.

5. The complementary electrochromic device of claim 1, wherein the cathodically coloring polymer comprises a compound selected from the group consisting of poly(3,4-ethylenedioxythiophene), poly(3,4-propylenedioxythiophene), poly(3,4-butylenedioxythiophene), poly(2-methyl-2,3-dihydrothieno[3,4-b][1,4]dioxepine), poly(2-hexyl-2,3-dihydrothieno[3,4-b][1,4]dioxepine), poly(2-octyl-2,3-dihydrothieno[3,4-b][1,4]dioxepine), poly(2-decyl-2,3-dihydrothieno[3,4-b][1,4]dioxepine), poly(2-tetradecyl-2,3- dihydrothieno[3,4-b][1,4]dioxepine), poly(2-phenyl-2,3-dihydrothieno[3,4-b][1,4]dioxepine), poly(3,3-dimethyl-3,4-dihydro-2H-thieno[3,4-b][1,4]dioxepine), poly(3,3-diethyl-3,4-dihydro-2H-thieno[3,4-b][1,4]dioxepine), poly(3,3-dibutyl-3,4-dihydro-2H-thieno[3,4-b][1,4]dioxepine), poly(3,3-dioctyl-3,4-dihydro-2H-thieno[3,4-b][1,4]dioxepine) and poly(dibenzylpropylenedioxythiophene).

6. The complementary electrochromic device of claim 1, wherein the anodically coloring substance comprises indium hexacyanoferrate.

7. The complementary electrochromic device of claim 1, wherein the anodically coloring substance comprises a compound selected from the group consisting of transition metal hexacyanometallates.

8. The complementary electrochromic device of claim 7, wherein the anodically coloring substance comprises a compound selected from the group consisting of iron hexacyanoferrate (Prussian Blue), titanium hexacyanoferrate, vanadium hexacyanoferrate, chromium hexacyanoferrate, cobalt hexacyanoferrate, nickel hexacyanoferrate, copper hexacyanoferrate, zinc hexacyanoferrate, palladium hexacyanoferrate, molybdenum hexacyanoferrate, platinum hexacyanoferrate, iron hexacyanocobaltate, iron hexacyanoruthenate, iron hexacyanoosmate and ruthenium hexacyanoruthenate.

9. The complementary electrochromic device of claim 8, wherein the anodically coloring substance comprises iron hexacyanoferrate (Prussian Blue).

10. The complementary electrochromic device of claim 1, wherein the electrolytic layer comprises a liquid, a gel or a solid.

11. The complementary electrochromic device of claim 10, wherein the electrolytic layer is a liquid and comprises one or more solvents and one or more ionically conductive salts.

12. The complementary electrochromic device of claim 10, wherein the electrolytic layer is a gel and comprises one or more solvents, one or more ionically conductive salts and one or more gel-forming polymers, which may be uncross-linked or partially cross-linked.

13. The complementary electrochromic device of claim 10, wherein the electrolytic layer is a solid and comprises one or more solvents, one or more ionically conductive salts and one or more highly cross-linked polymers.

14. The complementary electrochromic device of any one of claims 11-13, wherein the solvent is selected from the group consisting of ethylene carbonate, propylene carbonate, acetonitrile, propionitrile, glutaronitrile, methoxyacetonitrile, γ-butyrolactone, polyethylene glycol and mixtures thereof.

15. The complementary electrochromic device of any one of claims 11-13, wherein the ionically conductive salt is selected from the group consisting of $LiClO_4$, $LiBF_4$, $LiAsF_6$, LiI, $LiPF_6$, LiCl, $LiSO_3CF_3$, $LiN(SO_2CF_3)_2$, $NaClO_4$, $NaBF_4$, $NaAsF_6$, NaI, $KClO_4$, tetra-n-butylammonium iodide, tetramethylammonium fluoroborate, tetraethylammonium fluoroborate, tetra-n-butylammonium fluoroborate, tetraethylammonium perchlorate, tetra-n-butylammonium perchlorate, polystyrene sulfonate sodium salt and mixtures thereof.

16. The complementary electrochromic device of claim 12, wherein the polymer is selected from the group consisting of uncross-linked or lightly cross-linked polymethacrylate, poly(methyl methacrylate), polyacrylonitrile, polyethylene oxide, poly(hydroxyethyl methacrylate) and polyurethane.

17. The complementary electrochromic device of claim 13, wherein the polymer is selected from the group consisting of highly cross-linked polymethacrylate, poly(methyl methacrylate), polyacrylonitrile, polyethylene oxide, poly(hydroxyethyl methacrylate) and polyurethane.

18. The complementary electrochromic device of claim 16 or claim 17, wherein the polymer is cross-linked using a cross-linker selected from the group consisting of neopentyl glycol, dimethacrylate, ethylene glycol dimethacrylate, trimethylolpropane, tetraethylene glycol diacrylate and polyethylene glycol dimethacrylate.

19. The complementary electrochromic device of claim 1, wherein the first conductive layer is at a voltage of from about −1.0 volts to about −3.0 volts relative to the second conductive layer to effect switching of the device to a low transmittance state.

20. The complementary electrochromic device of claim 19, wherein the first conductive layer is at a voltage of from about −1.2 volts to about −1.8 volts relative to the second conductive layer.

21. The complementary electrochromic device of claim 1, wherein the first conductive layer is at a voltage of from about +0.3 to about +1.5 volts relative to the second conductive layer to effect switching of the device to a high transmittance state.

22. The complementary electrochromic device of claim 21, wherein the first conductive layer is at a voltage of from about +0.3 to about +0.8 volts relative to the second conductive layer.

23. The complementary electrochromic device of claim 1 wherein the charge capacity of the cathodic coloring polymer is from about 5 to about 100 $mC/cm^2$ and the charge capacity of the anodic coloring substance is from about 0.5 to about 50 $mC/cm^2$.

24. The complementary electrochromic device of claim 23, wherein the charge capacity of the cathodic coloring polymer is from about 12.5 to about 37.5 $mC/cm^2$ and the charge capacity of the anodic coloring substance is from about 1.0 to about 10 $mC/cm^2$.

25. The complementary electrochromic device of any one of claims 1, 23 or 24, wherein the cathodic coloring polymer and the anodic coloring substance have a charge capacity ratio of from about 0.5 to about 3.0.

26. The complementary electrochromic device of any one of claims 1, 23 or 24, wherein the cathodic coloring polymer and the anodic coloring substance have a charge capacity ratio of from about 0.5 to about 1.5.

27. The complementary electrochromic device of claim 1, further comprising:
a first transparent substrate layer in contact with the first conductive layer; and,
a second transparent substrate layer in contact with the second conductive layer, wherein:
the first and second transparent layers may be the same or different.

28. The complementary electrochromic device of claim 27, wherein the first and second transparent substrates are independently selected from the group consisting of a glass, a transparent mineral, a transparent flexible natural, semi-synthetic or synthetic polymer and a transparent rigid natural, semi-synthetic or synthetic polymer.

29. The complementary electrochromic device of claim 28, wherein the first and second transparent substrates are independently selected from the group consisting of a polyamide, a polyimide, a polyester, a polyethylene terephthalate, a polycarbonate, a polyacrylate, a polymethacrylate, a polystyrene, a polyolefin, a polyurethane, a polyacrylamide, a polymethacrylamide, a polyarylate and a polyfluorocarbon.

* * * * *